United States Patent Office 3,274,192
Patented Sept. 20, 1966

3,274,192
DERIVATIVES OF PYRAZINE AND A METHOD FOR THEIR PREPARATION
Edward J. Cragoe, Jr., Lansdale, and James H. Jones, Blue Bell, Pa., assignors to Merck & Co., Inc., Rahway, N.J., a corporation of New Jersey
No Drawing. Filed Oct. 4, 1965, Ser. No. 492,868
17 Claims. (Cl. 260—250)

This invention is concerned with (3-amino-5-X-6-Y-pyrazinimidoyl)guanidine compounds having the structural formula

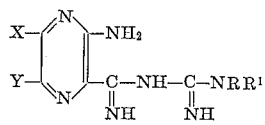

wherein X represents hydrogen, amino, or mono- or di-lower aliphaticamino, Y represents hydrogen, chloro, bromo or iodo, and R and $R^1$ separately are selected from hydrogen, lower alkyl, hydroxy-lower alkyl and phenyl-lower alkyl. The lower aliphatic group or groups attached to the amino nitrogen can be straight or branched chained, saturated or unsaturated and can be lower-cycloalkylalkyl.

The novel compounds of this invention possess diuretic and saluretic properties and are useful in the treatment of edema or other conditions associated with an abnormal retention of fluid and/or electrolytes, especially sodium and chloride ions. As these compounds are effective upon oral or parenteral administration, they can be administered in any of the usual suitable dosage forms such as admixed with lactose, encapsulated and administered orally. While the dosage will vary depending upon age and condition of the patient and the particular product used, effective dosages ranging between about 50–2000 mg./day generally will produce the desired effect.

The (3-amino-5-X-6-Y-pyrazinimidoyl)guanidine compounds are prepared by a novel process that involves reaction between a 3-amino-5-X-6-Y-pyrazinonitrile (II) and a guanidine (III). The reaction is conducted at controlled ambient temperature and advantageously in the presence of any anhydrous solvent such as any anhydrous lower alkanol.

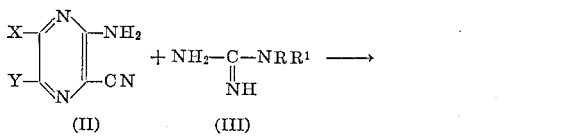

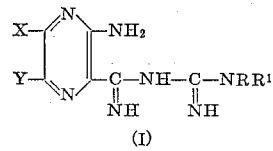

Alternatively, the (3-amino-5-X-6-Y-pyrazinimidoyl)-guanidine products of this invention can be prepared by the reaction of an alkyl 3-amino-5-X-6-Y-pyrazinimidate hydrochloride (IV) or an alkyl 3-amino-5-X-6-Y-pyrazinthioimidate (V) with a guanidine (III).

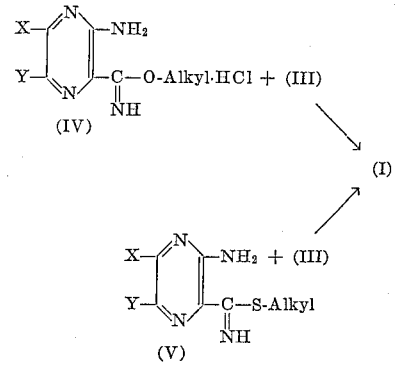

The reaction is advantageously conducted under controlled ambient temperature using a solvent such as a lower alkanol.

The intermediate alkyl 3-amino-5-X-6-Y-pyrazinimidate hydrochloride (IV) is prepared by the reaction of a primary lower alkanol with a 3-amino-5-X-6-Y-pyrazinonitrile (II) under acidic conditions. An acid such as anhydrous hydrogen chloride is generally employed.

The intermediate alkyl 3-amino-5-X-6-Y-pyrazinthioimidates (V) are prepared by the reaction of a primary lower alkyl mercaptan with a 3-amino-5-X-6-Y-pyrazinonitrile (II) under basic conditions. The reaction is advantageously carried out at ambient or slightly higher temperatures using a solvent such as a lower alkanol. The reaction medium is generally made basic by the addition of a few drops of an aqueous or alcoholic solution of an alkali metal hydroxide, such as, sodium hydroxide.

The 3-amino-5-X-6-Y-pyrazinonitriles used as starting material in the above methods can be prepared by one of several methods. One method involves a 3-step process which begins with the reaction of an alkyl 3-amino-5-X-6-Y-pyrazinoate with ammonia to give the corresponding 3-amino-5-X-6-Y-pyrazinamide. Ammonia in the form of ammonium hydroxide or liquid ammonia can be used and the reaction can be effected either at ambient temperature or at a slightly higher temperature and when using liquid ammonia the reaction advantageously is carried out in a closed reaction vessel although ammonia also could be admitted below the surface of a nonpolar solvent containing the ester.

The 3-amino-5-X-6-Y-pyrazinamide in the presence of dimethylformamide and either phosphoryl chloride or thionyl chloride and advantageously with slight warming forms the corresponding N,N-dimethyl-N'-(3-cyano-5-Y-6-X-2-pyrazinyl)formamidine which then can be hydrolyzed with a strong mineral or organic acid (hydrochloric, sulfuric, methanesulfonic, trichloroacetic and the like acid) to the deired 3-amino-5-X-6-Y-pyrazinonitrile.

A second method involves the reaction of 3-amino-5-chloro-6-halopyrazinonitrile (which can be prepared by the above method) with ammonia or a mono- or di-lower-alkylamine to produce the corresponding 3-amino-5-amino(or mono- or di-lower alkylamino-6-halopyrazinonitrile. The reaction is usually conducted in a suitable solvent; dimethyl sulfoxide is especially suitable although a lower alkanol can be employed.

The third method involves the preparation of 3-amino-6-halopyrazinonitriles (where X is hydrogen and Y is chloro, bromo or iodo) and consists of the direct halogenation of 3-aminopyrazinonitrile. Bromination and chlorination are carried out in acetic acid and iodination involves the use of iodine and mercuric acetate in aqueous dioxane.

The methods for producing the products of this invention will be described in greater detail in the following examples which are illustrative but not limitative of the invention.

EXAMPLE 1

*(3-aminopyrazinimidoyl)guanidine*

STEP A.—PREPARATION OF ETHYL 3-AMINOPYRAZIN-IMIDATE HYDROCHLORIDE 3-aminopyrazinonitrile (2.2 g., 0.0183 mole) and anhydrous ethanol (150 ml.) are placed in a flask which is fitted with a dropping funnel, mechanical stirrer and drying tube. The solid is dissolved by warming the reaction mixture. After solution is complete, the temperature is adjusted to 30° C., and a solution of dry hydrogen chloride (10 g.) in ethanol (50 ml.) is added with stirring. The mixture is stirred at room temperature for 18 hours and the yellow solid that separates is removed by filtration yielding 1.5 g. (41%) of ethyl 3-aminopyrazinimidate hydrochloride, M.P. 205° C. (dec.). This material is sufficiently pure for use in the subsequent reaction.

STEP B.—PREPARATION OF (3-AMINOPYRAZIN-IMIDOYL) GUANIDINE

Sodium (920 mg., 0.04 mole) is dissolved in dry methanol (50 ml.) under anhydrous conditions. The solution is cooled and dry pulverized guanidine hydrochloride (4.0 g., 0.042 mole) is added and the mixture stirred mechanically and refluxed for 30 minutes. After cooling and removing the sodium chloride by filtration, the filtrate is placed in a flask fitted with a mechanical stirrer and reflux condenser protected with a drying tube. Ethyl-3-aminopyrazinimate hydrochloride (1.5 g., 0.0074 mole) is added and the mixture warmed on a steam bath to effect solution. After standing at room temperature for 30 minutes, the yellow solid that separates from the reaction mixture is removed by filtration and dried yielding 1.1 g. (33%) of (3-aminopyrazinimidoyl) - guanidine M.P. 281.5° C. The product is purified by suspending in water, adding dilute hydrochloric acid until the solid dissolves, filtering and reprecipitating by the addition of dilute sodium hydroxide solution. The pure material is removed by filtration, washed with water and dried, M.P. 312° C.

*Analysis.*—calculated for $C_6H_9N_7$: C, 40.22; H, 5.06; N, 54.72. Found: C, 40.10; H, 5.04; N, 54.92.

(3-aminopyrazinimidoyl)guanidine can also be prepared by a modification of the procedure described in Example 1 which involves bubbling methyl mercaptan into the anhydrous ethanolic solution of 3-aminopyrazinonitrile containing two drops of sodium hydroxide solution. The methyl 3-aminopyrazinthioimidate obtained by adding water is dried and then is converted to the (3-aminopyrazinimidoyl)guanidine by the process described in Step B.

EXAMPLE 2

*(3-amino-5-dimethylamino-6-chloropyrazinimidoyl) guanidine*

STEP A.—PREPARATION OF 3-AMINO-5,6-DICHLOROPYRAZINAMIDE

A stainless steel autoclave is charged with methyl 3-amino-5,6-dichloropyrazinoate (11.1 g., 0.05 mole) and liquid ammonia (100 ml.) and is kept at 25° C. for 24 hours. The ammonia is expelled, and the product rinsed from the autoclave with methanol (200 ml.). The methanol insoluble fraction (4.0 g.) is recrystallized with dimethylformamide (40 ml.) to give pure 3-amino-5,6-dichloropyrazinamide, M.P. 291.5–293.5° C.

*Analysis.*—calculated for $C_5H_4Cl_2N_4O$: C, 29.07; H, 1.95; N, 27.06. Found: C, 29.58; H, 1.87; N, 27.36.

STEP B.—PREPARATION OF 3-AMINO-5-DIMETHYL-AMINO-6-CHLOROPYRAZINAMIDE 3-amino-5,6-dichloropyrazinamide (10 g., 0.0485 mole) is dissolved in dimethyl sulfoxide (150 ml.) by heating on a steam bath. A 25% solution of dimethylamine (20 g., 0.11 mole) in water is added dropwise with stirring to the hot solution and the mixture stirred for 10 minutes. After the addition is complete, the reaction mixture is poured into crushed ice (200 g.), the white product that separates is removed by filtration, washed with a litle water and dried, yielding 9 g. (86%) of 3-amino-5-dimethylamino-6-chloropyrazinamide, melting point 182° C. Recrystallization from ethanol gives material that melts at 182–183° C.

*Analysis.*—calculated for $C_7H_{10}ClN_5O$: C, 39.04; H, 4.68; N, 32.54. Found: C, 39.04; H, 4.55; N, 32.45.

STEP C.—PREPARATION OF 3-AMINO-5-DIMETHYL-AMINO-6-CHLOROPYRAZINONITRILE 3-amino-5-dimethylamino-6-chloropyrazinamide (8.0 g., 0.037 mole) is suspended in dimethylformamide (80 ml.) and phosphorus oxychloride (8.0 ml., 0.052 mole) is added rapidly with vigorous stirring. The temperature of the reaction mixture rises to 80° C. and is maintained at this temperature for 10 minutes by application of external heat. After cooling, the reaction mixture is poured into ice water (100 ml.) and concentrated ammonium hydroxide solution is added dropwise until the mixture is neutral to litmus paper. The yellow solid that separates is removed by filtration and immediately added to 2.5% hydrochloric acid (100 ml.) and the resulting solution is heated on a steam bath for 15 minutes. The product that separates upon cooling is removed by filtration and dried, yielding 4 g. (55%) of 3-amino-5-dimethylamino-6-chloropyrazinonitrile, M.P. 120.5–122.5° C. Recrystallization from a 1:1 water-alcohol mixture gives material with the same melting point.

*Analysis.*—calculated for $C_7H_8ClN_5$: C, 42.54; H, 4.14; N, 35.43. Found: C, 42.68; H, 4.10; N, 35.62.

STEP D.—PREPARATION OF (3-AMINO-5-DIMETHYL-AMINO-6-CHLOROPYRAZINIMIDOYL) GUANIDINE

Sodium (460 mg., 0.02 mole) is dissolved in anhydrous isopropyl alcohol (50 ml.). The solution is cooled and dry pulverized guanidine hydrochloride (1.91 g., 0.02 mole) is added and the mixture stirred mechanically and refluxed for 30 minutes. After cooling and removing the precipitated sodium chloride by filtration, the filtrate is treated with 3-amino-5-dimethylamino-6-chloropyrazinonitrile (2.0 g., 0.01 mole). The mixture is stirred mechanically for 2 hours at room temperature and the solvent then is removed by reduced pressure distillation at room temperature. The resulting solid is suspended in a little water, filtered, washed with water and dried, yielding 1.25 g. (48%) of (3-amino-5-dimethylamino-6-chloropyrazinimidoyl)guanidine, M.P. 115° C. (dec.). The compound is purified by suspending in water, dissolving by adding dilute hydrochloric acid, filtering and precipitating with dilute sodium hydroxide. After filtering, washing with water and drying, the melting point of the product remains the same.

*Analysis.*—calculated for $C_8H_{13}ClN_8$: C, 37.43; H, 5.11; N, 43.65; Cl, 13.81. Found: C, 37.68; H, 5.19; N, 43.22; Cl, 13.92.

EXAMPLE 3

*1-(3,5-diamino-6-bromopyrazinimidoyl)-3-benzylguanidine*

STEP A.—PREPARATION OF METHYL 3-AMINO-6-BROMOPYRAZINOATE 4-OXIDE

A solution of methyl 3-amino-6-bromopyrazinoate (4.6 g., 0.02 mole) and m-chloroperbenzoic acid (3.4 g., 0.02 mole) in chloroform (75 ml.) is refluxed for one hour, then chilled. The solid that separates is recovered by filtration and recrystallized from ethanol to yield 5.0 g. (98%) of methyl 3-amino-6-bromopyrazinoate 4-oxide, M.P. 200–202° C.

*Analysis.*—Calculated for $C_6H_6N_3O_3Br$: C, 29.05; H, 2.44; N, 16.94. Found: C, 29.12; H, 2.27; N, 17.12.

STEP B.—PREPARATION OF METHYL 3-AMINO-5-CHLORO-6-BROMOPYRAZINOATE

Methyl 3-amino-6-bromopyrazinoate 4-oxide (2.0 g., 0.008 mole) is dissolved in dimethylformamide (20 ml.), phosphorus oxychloride (2.0 ml.) is added and the reaction mixture is stirred vigorously for 30 minutes and then poured into water (100 ml.). The clear solution deposits reddish crystals after standing for several hours, which are recrystallized from acetonitrile to yield 1.5 g. (71%) of methyl 3-amino-5-chloro-6-bromopyrazinoate, M.P. 225–228° C.

*Analysis.*—Calculated for $C_6H_5N_3O_2BrCl$: C, 27.04; H, 1.89; N, 15.77. Found: C, 27,38; H, 2.21; N, 15.93.

STEP C.—PREPARATION OF 3-AMINO-5-CHLORO-6-BROMOPYRAZINAMIDE

A stainless steel autoclave is charged with methyl 3-amino-5-chloro - 6 - bromopyrazinoate (0.05 mole) and liquid ammonia (100 ml.) and is kept at 25° C. for 24 hours. The ammonia is expelled, and the product rinsed from the autoclave with methanol (200 ml.) to give 3-amino-5-chloro-6-bromopyrazinamide.

STEP D.—PREPARATION OF N,N-DIMETHYL-N'-(3-CYANO-5-BROMO-6-CHLORO-2-PYRAZINYL)FORMAMIDINE

A suspension of 3-amino-5-chloro - 6 - bromopyrazinamide (0.106 mole) in dimethylformamide (220 ml.) is stirred and treated with phosphoryl chloride (22 ml.). The temperature spontaneously rises to 65° C. after which it is heated to 80° C. and then stirred with heating for 10 minutes. The solution is cooled, and poured into water (500 ml.) to give N,N-dimethyl-N'-(3-cyano-5-bromo-6-chloro-2-pyrazinyl)formamidine.

STEP E.—PREPARATION OF 3-AMINO-5-CHLORO-6-BROMOPYRAZINONITRILE

A solution of N,N-dimethyl-N'-(3-cyano-5-bromo - 6-chloro-2-pyrazinyl)formamidine (0.01 mole) in a solution of water (100 ml.) and 6 N hydrochloric acid (10 ml.) is stirred and heated on a steam bath for an hour. The mixture is cooled and the solid recovered by filtration yielding 3-amino-5-chloro-6-bromopyrazinonitrile

STEP F.—PREPARATION OF 3,5-DIAMINO-6-BROMOPYRAZINONITRILE

A solution of 3-amino-5-chloro-6-bromopyrazinonitrile (11.7 g., 0.05 mole) in dimethyl sulfoxide (50 ml.) is stirred and heated on a steam bath while ammonia gas is admitted below the surface of the solution. The addition requres 30 minutes, after which the solution is cooled and poured into water (150 ml.). The solid that separates is removed by filtration, washed with water and dried yielding 3,5-diamino-6-bromopyrazinonitrile.

STEP G.—PREPARATION OF 1-(3,5-DIAMINO-6-BROMOPYRAZINIMIDOYL)-3-BENZYLGUANIDINE

This product is prepared following the procedure described in Example 2, Step D, except the guanidine hydrochloride and the 3-amino-5-dimethylamino - 6 - chloropyrazinonitrile are replaced by equimolecular quantities of benzylguanidine hydrochloride and 3,5-diamino-6-bromopyrazinonitrile respectively.

EXAMPLE 4

*1-(3,5-diamino-6-iodopyrazinimidoyl)-3,3-diethylguanidine*

STEP A.—PREPARATION of N,N-DIMETHYL-N'-(3-CYANO-5,6-DICHLORO-2-PYRAZINYL)FORMAMIDINE

A suspension of 3-amino - 5,6 - dichloropyrazinamide, from Example 2, Step A, (22 g., 0.106 mole) in dimethylformamide (220 ml.) is stirred and treated with phosphoryl chloride (22 ml.). The temperature spontaneously rises to 65° C. after which it is heated to 80° C. and then stirred with heating for 10 minutes. The solution is cooled and poured into water (500 ml.) to give 12.5 g. (48%) of N,N - dimethyl-N'-(3-cyano-5,6-dichloro-2-pyrazinyl) formamidine, M.P. 116–118° C. After recrystallization from methylcyclohexane the product melts at 117–119° C.

*Analysis.*—Calculated for $C_8H_7Cl_2N_5$: C, 39.35; H, 2.89; N, 28.70. Found: C, 38.76; H, 3.05; N, 28.94.

STEP B.—PREPARATION OF 3-AMINO-5-6-DICHLOROPYRAZINONITRILE

A solution of N,N-dimethyl-N'-(3-cyano-5,6-dichloro-2-pyrazinyl)formamidine (2.5 g., 0.01 mole) in a solution of water (100 ml.) and 6 N hydrochloric acid (10 ml.) is stirred and heated on a steam bath for an hour. The mixture is cooled and the pale yellow solid recovered by filtration yielding 1.85 g. (95%) of product, M.P. 290–295° C. After recrystallization from water, 3,5-diamino-6-chloropyrazinonitrile melts at 295° C.

*Analysis.*—Calculated for $C_5H_4N_5Cl$: C, 35.41; H, 2,48; N, 41.30. Found: C, 35,69; H, 2.30; N, 41.10.

STEP C.—PREPARATION OF 3,5-DIAMINO-6-CHLOROPYRAZINONITRILE

This product is prepared by the process described in Example 3, Step F, except 3-amino-5-chloro-6-bromopyrazinonitrile is replaced by an equimolecular quanitiy of 3-amino-5,6-dichloropyrazinonitrile. A 60% yield of 3,5-diamino-6- chloropyrazinonitrile is obtained, which, after recrystallization from water melts at 295° C.

*Analysis.*—Calculated for $C_5H_4ClN_5$: C, 35.41; H, 2.48; N, 41.30. Found: C, 35.69; H, 2.30; N, 41.10.

STEP D.—PREPARATION OF 3,5-DIAMINOPYRAZINONITRILE

A mixture of 3,5-diamino-6-chloropyrazinonitrile (11.9 g., 0.07 mole), 5% palladium on charcoal catalyst (9 g.), magnesium oxide (4.0 g., 0.1 mole) and methanol (250 ml.) is shaken in an atmosphere of hydrogen for 18 hours at room temperature at an initial pressure of 30 p.s.i. The pressure drop indicates an absorption of 0.07 mole of hydrogen. The mixture is filtered and the solids extracted with a boiling solution of 2-propanol (500 ml.) and water (250 ml.). The methanol filtrate and the 2-propanol-water extract are united and concentrated to a volume of 50 ml. and cooled. The 3,5-diaminopyrazinonitrile that separates is removed by filtration, dried and recrystallized from a mixture of 2-propanol and water.

STEP E.—PREPARATION OF 3,5-DIAMINO-6-IODOPYRAZINONITRILE

A suspension of 3,5-diaminopyrazinonitrile (13.4 g., 0.1 mole) in water (300 ml.) is heated to 70° C., then mercuric acetate (3.2 g., 0.1 mole) and a solution of iodine (25 g., 0.1 mole) in warm dioxane (200 ml.) is added quickly. The mixture is stirred and heated on a steam bath for 5 minutes, then allowed to cool to room temperature and treated with an aqueous solution of potassium iodide (500 ml. containing 75 g. of potassium iodide). The red solution quickly deposits a crystalline product which is separated by filtration, dried and recrystallized from a mixture of 2-propanol and water.

STEP F.—PREPARATION OF 1-(3,5-DIAMINO-6-IODOPYRAZINIMIDOYL)-3,3-DIETHYLGUANIDINE

This product is prepared following the procedure described in Example 2, Step D, except the guanidine hydrochloride and the 3-amino-5-dimethylamino-6-chloropyrazinonitrile are replaced by equimolecular quantities of 1,1-diethylguanidine hydrochloride and 3,5-diamino-6-iodopyrazinonitrile respectively.

EXAMPLE 5

*1-(3,5-diamino-6-chloropyrazinimidoyl) (2-hydroxyethyl)guanidine*

This product is prepared following substantially the same procedure described in Example 2, Step D, except the guanidine hydrochloride and the 3-amino-5-dimethylamino-6-chloropyrazinonitrile are replaced by equimolecular quantities of (2-hydroxyethyl)guanidine sulfate and 3,5-diamino-6-chloropyrazinonitrile (from Example 4, Step C) respectively.

EXAMPLE 6

*1-(3-amino-5-isopropylamino-6-chloropyrazinimidoyl)-3-(2-hydroxethyl)guanidine*

STEP A.—PREPARATION OF 3-AMINO-5-ISOPROPYL-AMINO-6-CHLOROPYRAZINONITRILE

A solution of 3-amino-5,6-dichloropyrazinonitrile, from Example 4, Step B, (6.2 g., 0.033 mole) in dimethyl sulfoxide (50 ml.) at 70° C. is treated with isopropylamine (3.88 g., 0.066 mole) and the solution stirred at this temperature for 10 minutes. After cooling the solution is poured into water (150 ml.) and the solid that separates is removed by filtration, washed with water and dried yielding 6.4 g. (92%) of 3-amino-5-isopropylamino-6-chloropyrazinonitrile, M.P. 124–127° C. After recrystallization from methylcyclohexane, the product melts at 126–128° C.

*Analysis.*—Calculated for $C_8H_{10}ClN_5$: C, 45.46; H, 4.76; N, 33.12. Found: C, 44.81; H, 4.81; N, 33.35.

STEP B.—PREPARATION OF 1-(3-AMINO-5-ISOPROPYL-AMINO-6-CHLOROPYRAZINIMIDOYL)-3-(2-HYDROXYETHYL)GUANIDINE

This product is prepared by substantially the same procedure described in Example 2, Step D, except the guanidine hydrochloride and the 3-amino-5-dimethylamino-6-chloropyrazinonitrile are replaced by equimolecular quantities of (2-hydroxyethyl)guanidine sulfate and 3-amino-5-isopropylamino-6-chloropyrazinonitrile respectively.

EXAMPLE 7

*1-(3-amino-5-isopropylamino-6-chloropyrazinimidoyl)-3,3-dimethylguanidine*

This product is prepared following substantially the same procedure described in Example 2, Step D, except the guanidine hydrochloride and 3-amino-5-dimethylamino-6-chloropyrazinonitrile are replaced by equimolecular quantities of 1,1-dimethylguanidine sulfate and 3-amino-5-isopropylamino-6-chloropyrazinonitrile (from Example 6, Step A) respectively.

EXAMPLE 8

*(3-amino-5-cyclopropylmethylamino-6-chloropyrazinimidoyl)guanidine*

STEP A.—PREPARATION OF 3-AMINO-5-CYCLOPROPYL-METHYLAMINO-6-CHLOROPYRAZINONITRILE

This product is prepared by substantially the same method described in Example 6, Step A, except the isopropylamine is replaced by an equimolecular quantity of cyclopropylmethylamine.

STEP B.—PREPARATION OF (3-AMINO-5-CYCLOPROPYL-METHYLAMINO - 6 - CHLOROPYRAZINIMIDOYL)GUANIDINE

This product is prepared following substantially the same procedure described in Example 2, Step D, except the 3-amino-5-dimethylamino-6-chloropyrazinonitrile is replaced by an equimolecular quantity of 3-amino-5-cyclopropylmethylamino-6-chloropyrazinonitrile.

EXAMPLE 9

*[3-amino-5-(N-methyl-N-allylamino)-6-chloropyrazinimidoly]guanidine*

STEP A.—PREPARATION OF 3-AMINO-5-(N-METHYL-N-ALLYLAMINO)-6-CHLOROPYRAZINONITRILE

This product is prepared by substantially the same procedure described in Example 6, Step A, except the isopropylamine is replaced by an equimolecular quantity of N-methyl-N-allylamine.

STEP B.—PREPARATION OF [3-AMINO-5-(N-METHYL-N-ALLYLAMINO) - 6 - CHLOROPYRAZINIMIDOYL]GUANIDINE

This product is prepared by substantially the same method described in Example 2, Step D, except the 3-amino-5-dimethylamino-6 - chloropyrazinonitrile is replaced by an equimolecular quantity of 3-amino-5-(N-methyl-N-allylamino)-6-chloropyrazinonitrile.

EXAMPLE 10

*1-(3-amino-5-diethylamino-6-chloropyrazinimidoyl) 3,3-dimethylguanidine*

STEP A.—PREPARATION OF 3-AMINO-5-DIETHYL-AMINO-6-CHLOROPYRAZINONITRILE

This product is prepared following substantially the same procedure described in Example 6, Step A, except the isopropylamine is replaced by an equimolecular quantity of diethylamine.

STEP B.—PREPARATION OF 1-(3-AMINO-5-DIETHYL-AMINO - 6 - CHLOROPYRAZINIMIDOYL)-3,3-DIMETHYLGUANIDINE

This product is prepared by following essentially the same method described in Example 2, Step D, except the guanidine hydrochloride and the 3-amino-5-isopropylamino-6-chloropyrazinonitrile are replaced by equimolecular quantities of 1,1-dimethylguanidine sulfate and 3-amino-5-diethylamino-6-chloropyrazinonitrile respectively.

While the invention has been described by certain specific reactants and certain specific reaction conditions to produce specific novel products, it is to be understood that the invention is not limited by the examples but embraces the variations hereinbefore described and hereinafter claimed.

What is claimed is:

1. A process involving the reaction of 3-amino-5-X-6-Y-pyrazinonitrile with a guanidine of the formula $$H_2N-\underset{\underset{NH}{\|}}{C}-NRR^1$$

under controlled ambient temperature to form a product having the structural formula $$X-\underset{Y}{\overset{N}{\underset{N}{\bigcirc}}}\begin{matrix}-NH_2\\ -C-NH-C-NRR^1\\ \|\quad\quad\|\\ NH\quad NH\end{matrix}$$

wherein each of the foregoing compounds X is selected from the group consisting of hydrogen, amino, mono-lower aliphaticamino and di-lower-aliphaticamino; Y is selected from hydrogen, chloro, bromo and iodo; and R and $R^1$ separately are selected from hydrogen, lower alkyl, hydroxy-lower alkyl and phenyl-lower alkyl.

2. A process as claimed in claim 1 wherein the reaction is conducted in the presence of an anhydrous lower alkanol solvent.

3. A process as claimed in claims 1 and 2, wherein the pyrazinonitrile reactant is 3,5-diamino-6-chloropyrazinonitrile.

4. A process as claimed in claims 1 and 2, wherein the pyrazinonitrile reactant is 3-amino-5-lower aliphaticamino-6-chloropyrazinonitrile.

5. A process as claimed in claims 1 and 2, wherein the pyrazinonitrile reactant is 3-amino-5-(di-lower aliphaticamino)-6-chloropyrazinonitrile.

6. A process involving the reaction of 3,5-diamino-6-chloropyrazinonitrile with guanidine in the presence of an anhydrous lower alkanol under controlled ambient temperature conditions to form (3,5-diamino-6-chloropyrazinimidoyl)guanidine.

7. (3 - amino-5-X-6-Y-pyrazinimidoyl)guanidine compounds having the structural formula

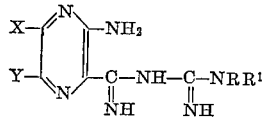

wherein X is selected from the group consisting of hydrogen, amino, mono-lower aliphaticamino and di-loweraliphaticamino; Y is selected from hydrogen, chloro, bromo and iodo; and R and R¹ separately are selected from the group consisting of hydrogen, lower alkyl, hydroxy-lower alkyl, and phenyl-lower alkyl.

8. (3-aminopyrazinimidoyl)guanidine.
9. (3 - amino-5-di-lower alkylamino-6-chloropyrazinimidoyl)guanidine.
10. (3 - amino - 5 - dimethylamino-6-chloropyrazinimidoyl)guanidine.
11. [3 - amino - 5 - (N - methyl-N-alkylamino)-6-chloropyrazinimidoyl]guanidine.
12. (3,5-diamino-6-chloropyrazinimidoyl)guanidine.
13. 1 - (3,5 - diamino-6-chloropyrazinimidoyl)-3,3-dilower alkylguanidine.
14. 1 - (3,5 - diamino-6-chloropyrazinimidoyl)-3-(hydroxy-lower alkyl)guanidine.
15. 1 - (3,5 - diamino-6-chloropyrazinimidoyl)-3-(2-hydroxyethyl)guanidine.
16. 1 - (3 - amino-5-di-lower alkylamino-6-chloropyrazinimidoyl)-3,3-di-lower alkylguandine.
17. 1 - (3 - amino - 5 - diethylamino-6-chloropyrazinimidoyl)-3,3-dimethylguanidine.

No references cited.

NICHOLAS S. RIZZO, *Primary Examiner.*